United States Patent [19]

Yun

[11] Patent Number: 5,333,060
[45] Date of Patent: Jul. 26, 1994

[54] VIDEO SIGNAL PROCESSING CIRCUIT OF A VIDEO SIGNAL RECORDER/REPRODUCER

[75] Inventor: Jong-kyung Yun, Kyunggi-do, Rep. of Korea

[73] Assignee: SamSung Electronics Co., Ltd., Kyungki-do, Rep. of Korea

[21] Appl. No.: 780,000

[22] Filed: Oct. 21, 1991

[30] Foreign Application Priority Data

Nov. 14, 1990 [KR] Rep. of Korea ............... 90-18408
Sep. 10, 1991 [KR] Rep. of Korea ............... 91-15774

[51] Int. Cl.$^5$ .................................... H04N 9/79
[52] U.S. Cl. .................................. 358/310; 348/453; 348/427
[58] Field of Search ............ 358/310, 335, 39, 11, 358/12, 138; H04N 9/79, 5/76, 9/77, 11/20, 11/06, 7/12

[56] References Cited

U.S. PATENT DOCUMENTS

| | | | |
|---|---|---|---|
| 4,541,014 | 9/1985 | Yagi | 358/37 |
| 4,660,072 | 4/1987 | Fukinuki | 358/12 |
| 4,745,460 | 5/1988 | Fukinuki | 358/12 |
| 5,031,030 | 7/1991 | Hurst, Jr. | 358/12 |
| 5,113,262 | 5/1992 | Strolle et al. | 358/323 |

FOREIGN PATENT DOCUMENTS 314270A 5/1989 European Pat. Off. ....... H04N 9/79

Primary Examiner—Tommy P. Chin
Assistant Examiner—Thai Tran
Attorney, Agent, or Firm—Robert E. Bushnell

[57] ABSTRACT

Video signal processing circuits which improves an adaptive folding circuit and an adaptive unfolding circuit for lowering and restoring the signal level of a high frequency component in processing a luma signal of a video signal wherein the adaptive folding/unfolding circuits include delays for delaying the luma signal by one pixel respectively formed at both the input terminal and the output terminal of conventional folding/unfolding portions, a level detector for detecting the level of the luma signal, a multiplexer for multiplexing the luma signal in accordance with the detected level value, a high band adjuster having a BPF, an LPF, an inverter and a substracter for decreasing and restoring the high band component while folding the luma signal, a level compensator for compensating the level in accordance with the detected level value, an adder for adding the output signals from the multiplexer, and a mixer for mixing the output signal of the adder with the output signal of the level compensator, so that the high band component level is reduced during folding and restored during reproducing, preventing the deterioration of image quality due to the high frequency component which is folded into the low frequency component.

29 Claims, 5 Drawing Sheets

VIDEO SIGNAL PROCESSING CIRCUIT OF A VIDEO SIGNAL RECORDER/REPRODUCER

BACKGROUND OF THE INVENTION

The present invention relates to a video signal processing circuit of a video signal recorder/reproducer, and particularly to a video signal processing circuit of a video signal recorder/reproducer which includes an improved adaptive folding circuit capable of lowering the signal level of a high frequency component to be folded during recording to control the signal level of an unnecessary high frequency component in processing a luma signal of the video signal, and an improved adaptive unfolding circuit capable of restoring an unfolded high frequency component signal during reproduction.

In recent years, video signal processing circuits have used folding and unfolding circuits to increase the amount of information which can be accommodated by a predetermined narrow band channel so that the high frequency components of a video signal are folded around a selected folding frequency. Then, the folded high frequency component is placed within a specific spectral gap in the video signal.

However, in the above-mentioned video signal processing technique of a video signal recording/reproducing system, the signal level of the high frequency component folded into the low frequency component is too high to be properly eliminated when unfolding is performed in a conventional unfolding circuit during reproduction. Thus, the image quality may be damaged during the unfolding process.

Moreover, when the video signal with the high frequency component folded into the low frequency component is reproduced by a conventional reproduction device without an unfolding circuit, the high frequency component folded into the low frequency component during the recording process is useless and furthermore, creates noise in the low frequency component which detrimentally effects image quality. Accordingly, the conventional reproducer reproduces the image with noise.

SUMMARY OF THE INVENTION

The present invention is devised to solve the above-described problems.

An object of the present invention is to provide improved adaptive folding/unfolding circuits in a luma signal processing unit of a conventional video signal processor which are used for lowering a high frequency component level of a luma signal prior to folding during recordation, and, after unfolding of the luma signal, for restoring the unfolded high frequency component level during reproduction.

Another object of the present invention is to prevent a high frequency component from interfering with a low frequency component.

Still another object of the present invention is to reproduce a video signal with suppressed noise due to a high frequency component level being lowered during recordation, when a folded signal is reproduced using a conventional video signal recorder/reproducer lacking an unfolding system to a luma signal processing unit within a video signal reproducer.

To achieve these and other objects, there is provided a video signal recording circuit which includes: a chroma/motion signal processor for A/D converting a composite video signal, separating the chroma and motion signals from the digital composite video signal, and processing the chroma and motion signals; an adaptive luma signal processor for separating a luma signal from the digital composite video signal, and adaptively processing the luma signal in accordance with the separated motion signal; an adaptive folding means for adding a folding signal to the luma signal supplied from the adaptive luma signal processor, and folding the high frequency component into the low frequency component of the luma signal; and a luma/chroma recorder for D/A converting the signals supplied from the adaptive folding means and from the chroma/motion signal processor and recording the analog-converted signals on a medium with a certain limited bandwidth through a recording head, wherein the adaptive folding means comprises:

a first low-pass filter for low-pass filtering the luma signal supplied from the adaptive luma signal processor;

a first high-pass filter for high-pass filtering the luma signals supplied from the adaptive luma signal processor and from the first output terminal of the first low-pass filter;

a band-pass filter for band-pass filtering the luma signal supplied from the first output terminal of the first low-pass filter;

a second low-pass filter for low-pass filtering the signal supplied from the band-pass filter;

a second high-pass filter for high-pass filtering the signals from the band-pass filter and the signal, from the second low-pass filter;

an inverter for inverting the signal supplied from the second high-pass filter;

a level compensator for compensating the frequency level of the signals supplied from the second low-pass filter and from the inverter;

a level detector for receiving the signal supplied from the first high-pass filter to detect the level of the signal, and for supplying the detected level signal to the first low-pass filter and to the level compensator;

a mixer for receiving the signals supplied from the second output terminal of the first low-pass filter and from the level compensator, and for outputting the signal of which high frequency level is lowered; and a folding circuit for adding a folding signal to the signal supplied from the mixer, and folding the high frequency component into the low frequency component of the signal.

Further, there is also provided a video signal reproducing circuit including:

a standard luma reproducer for reproducing a composite video signal with a predetermined full bandwidth which is previously recorded on a record medium with a certain limited bandwidth via a reproducing head, and reproducing a luma signal having a high frequency component which is folded into a low frequency component included in the composite video signal; a standard chroma/motion signal reproducer for reproducing a chroma/motion signal representing a chroma and motion signal from the composite video signal; a luma signal preprocessor connected to the standard luma reproducer for clamping and A/D converting the luma signal, and for generating a time base-corrected signal; a chroma/motion signal preprocessor connected to the standard chroma/motion signal reproducer for clamping and A/D converting the chroma/motion signal, and for generating a time base-corrected signal; a chroma/motion signal separator for receiving and separating the chroma/motion signal output from the chroma/motion signal preprocessor to output a chroma and motion signals, respectively; an adaptive unfolding means for receiving the signal output from the luma signal pieprocessor, removing the folding signal which is included in the luma signal during reproducing in accordance with the level amount of the motion signal separated in the chroma/motion signal separator during reproducing, and adaptively unfolding the high frequency component folded into the low frequency component of the luma signal to output the unfolded luma signal; and a composite video signal generator for D/A converting the signals which are supplied from the adaptive unfolding means and the chroma/motion signal separator, respectively, and mixing the analog-converted signals to output a composite video signal, wherein the adaptive unfolding means comprises:

an unfolding portion for removing the folding signal from the signal supplied from the luma signal preprocessor, and unfolding and outputting the high frequency component folded into the low frequency component of the luma signal;

a first low-pass filter for low-pass filtering the unfolded luma signal supplied from the unfolding portion;

a first high-pass filter for high-pass filtering the signals supplied from the unfolding portion and from the first output terminal of the first low-pass filter;

a band-pass filter for band-pass filtering the signal supplied from the first output terminal of the first low-pass filter;

a second low-pass filter for low-pass filtering the signal supplied from the band-pass filter;

a second high-pass filter for high-pass filtering the signals supplied from the band-pass filter and from the second low-pass filter;

an inverter for inverting the signal supplied from the second low-pass filter;

a level compensator for compensating the frequency levels of the signals supplied from the inverter and from the second high-pass filter;

a level detector for detecting the level of the signal supplied from the first high-pass filter, and for supplying the detected level signal to the first low-pass filter and said level compensator; and a mixer for receiving the signals supplied from the second output terminal of the first low-pass filter and from the level compensator, and for outputting the signal of which high frequency level is restored.

BRIEF DESCRIPTION OF THE DRAWINGS

Other objects and advantages of the present invention will become more apparent by the following description with reference to accompanying drawings, in which:

FIG. 5A$b$ is a waveform of an output signal from a first delay shown in FIG. 3;

FIG. 5A$c$ is a waveform of an output signal from a second delay shown in FIG. 3;

DETAILED DESCRIPTION OF THE INVENTION

Prior to describing a preferred embodiment of the present invention with reference to the accompanying drawings, a video signal recorder/reproducer will now be described briefly to which the present invention is adapted.

Figure 1:
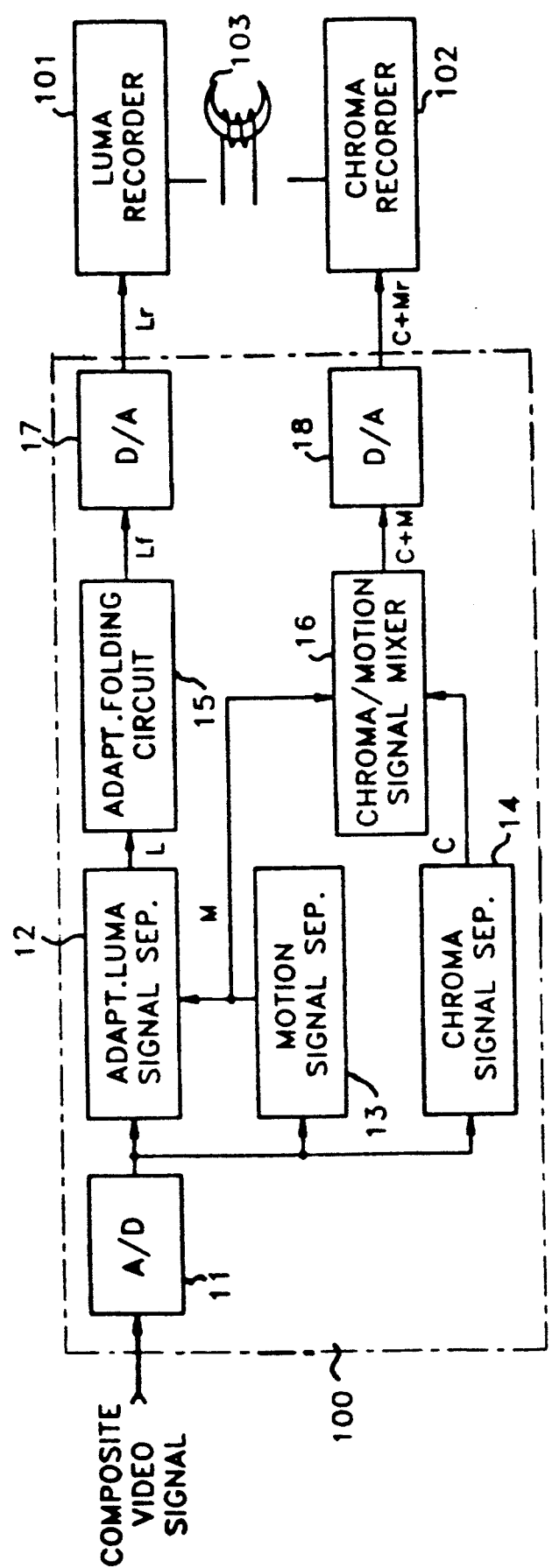
FIG. 1 is a block diagram showing a video signal recording circuit of a video signal recorder/reproducer to which the present invention is adapted.

Referring to a recording circuit of the video signal recorder/reproducer to which the present invention is adapted as illustrated in FIG. 1, when an encoder 100 receives a composite video signal, an A/D converter 11 converts the composite video signal into a digital signal, and then supplies it to an adaptive luma signal separator 12, a motion signal separator 13 and a chroma signal separator 14, to separate it into a luma signal L, a motion signal M, and a chroma signal C. Then, the luma signal L separated from the luma signal separator 12 is supplied to an adaptive folding circuit 15, which folds the high frequency component of the luma signal into the low frequency component, and outputs the folded luma signal Lf. Thereafter, the folded luma signal Lf is converted into an analog signal Lr in a first D/A converter 17, and is recorded onto a video cassette tape via a luma recorder 101 and a recording head 103.

On the other hand, the motion signal M and the chroma signal C extracted from the motion signal separator 13 and the chroma signal separator 14 are mixed to form a composite chroma signal C+M in a chroma/motion signal mixer 16. The composite chroma signal C+M is then converted into an analog signal C+Mr in a second D/A converter 18, and recorded onto the video cassette tape via the chroma recorder 102 and the recording head 103.

In order to describe the reproduction process of the video signal recorded in the above-mentioned manner, a reproduction circuit of the video signal recorder/ reproducer shown in FIG. 2 will now be described briefly to which the present invention is adapted.

According to FIG. 2, the elements shown in the luma signal path of the drawing operate to extract a full bandwidth luma signal from the folded bandwidth luma signal which was recorded on the video cassette tape in such a manner explained with reference to FIG. 1. The reproduced luma signal Lpb is preprocessed in a luma signal prepossessing unit 20 constituting a first clamping circuit 21, a first A/D converter 22, and a first time base corrector (hereinafter, referred to as TBC) 23, then is supplied to an adaptive unfolding circuit 25. The first clamping circuit 21 operates in the typical manner, and clamps the input signal as a prearranged digital value utilized in the first A/D converter 22 after receiving the luma signal Lpb which is reproduced from a standard luma signal reproducer 201. Thereafter, the first A/D converter 22 outputs a sampled multiple bit digital signal which represents the reproduced folded luma signal. The first TBC 23 corrects the inconsistency in time or another sources which are caused by a jitter in the tape mechanism, and outputs a restored folded luma signal Lf.

On the other hand, the elements shown in the chroma/motion signal path of the drawing operate to extract the chroma/motion signal which was recorded on the video cassette tape in such a manner illustrated in FIG. 1. The chroma/motion signal C+Mpb which is a bilateral signal and is reprocessed in a chroma/motion signal prepossessing unit 30 constituting a second clamping circuit 31, a second A/D converter 32, and a second TBC 33, and then is supplied to a chroma/motion signal separator 35. The second clamping circuit 31 clamps the chroma/motion signal C+Mpb which is reproduced from a standard chroma/motion signal reproducer 202, to establish a predetermined digital signal utilized in the second A/D converter 32. The second A/D converter 32 generates a sampled multiple bit digital signal which represents chroma/motion signal. The second TBC 33 corrects for any time-inconsistencies of the digital signal, and generates a restored chroma/motion signal C+M which in turn is supplied to the chroma/motion signal separator 35.

Next, the folded luma signal Lf is supplied to an adaptive unfolding circuit 25, and is then changed into an unfolded luma signal Luf in accordance with the motion signal supplied from the chroma/motion signal separator 35. The unfolded luma signal Luf is supplied to a composite video signal generator 40 via a first D/A converter 26. The composite video signal generator 40 receives the chroma signal C generated from the chroma/motion signal separator 35 and the unfolded luma signal Luf generated from the adaptive unfolding circuit 25 through first and second D/A converters 26 and 36, respectively, and reproduces a composite video signal.

As the above descriptions on the processes for recording/reproducing the video signal of the video signal recorder/reproducer to which the present invention is adapted, the signal level of the high frequency component of the luma signal is so high that the high frequency component folded into the low frequency component of the luma signal easily interferes with the low frequency component during recording. Moreover, since the signal level of the folded high frequency component is too high, the video device without the unfolding circuit generates noise during reproducing.

Accordingly, in the present invention, improved adaptive folding/unfolding circuits are added to the luma signal processing unit of the conventional video signal processor, wherein the level of the high frequency component to be folded is decreased prior to being folded during recording, and the level of the high frequency component unfolded by passing through the unfolding circuit during reproduction is restored.

Figure 3:
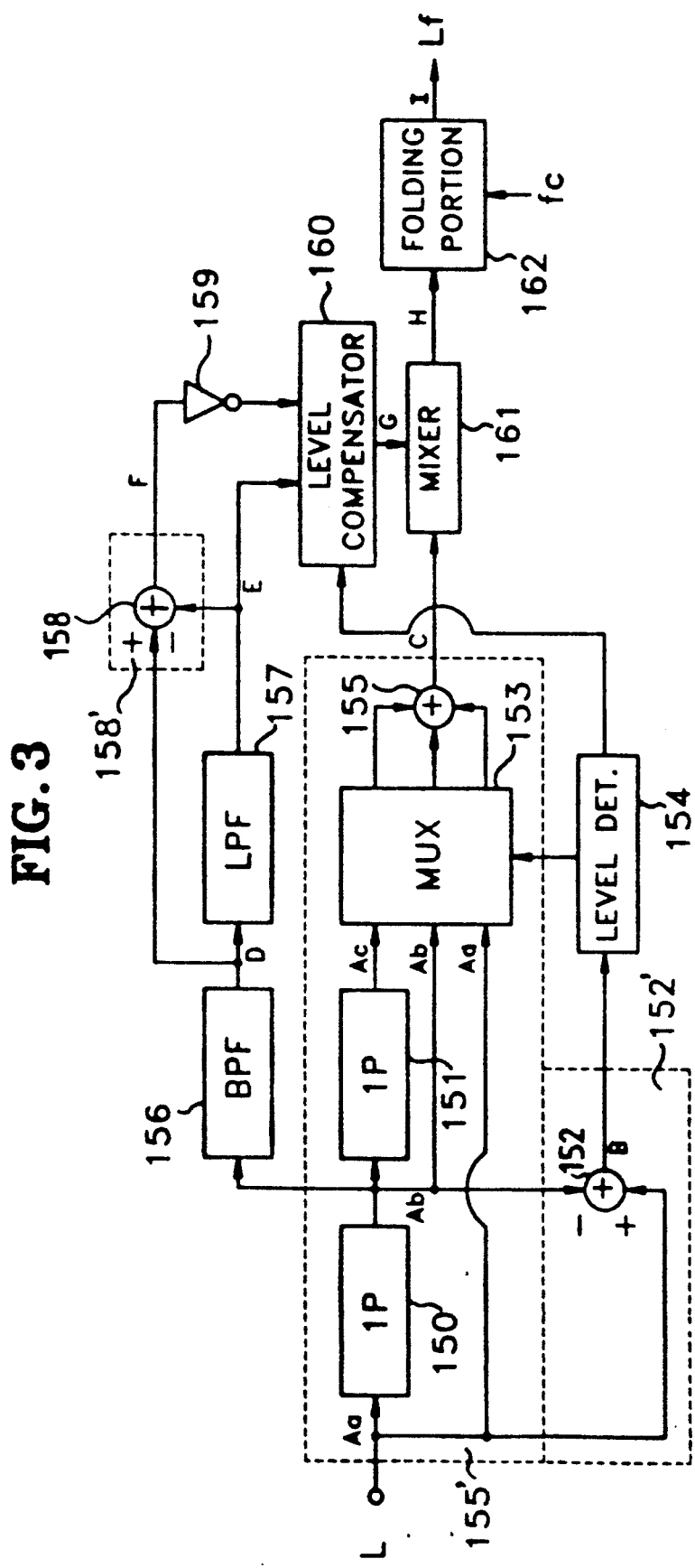
FIG. 3 is a detailed block diagram of an adaptive folding circuit according to the present invention, which is adapted to the video signal recording circuit shown in FIG. 1.
Figure 4:
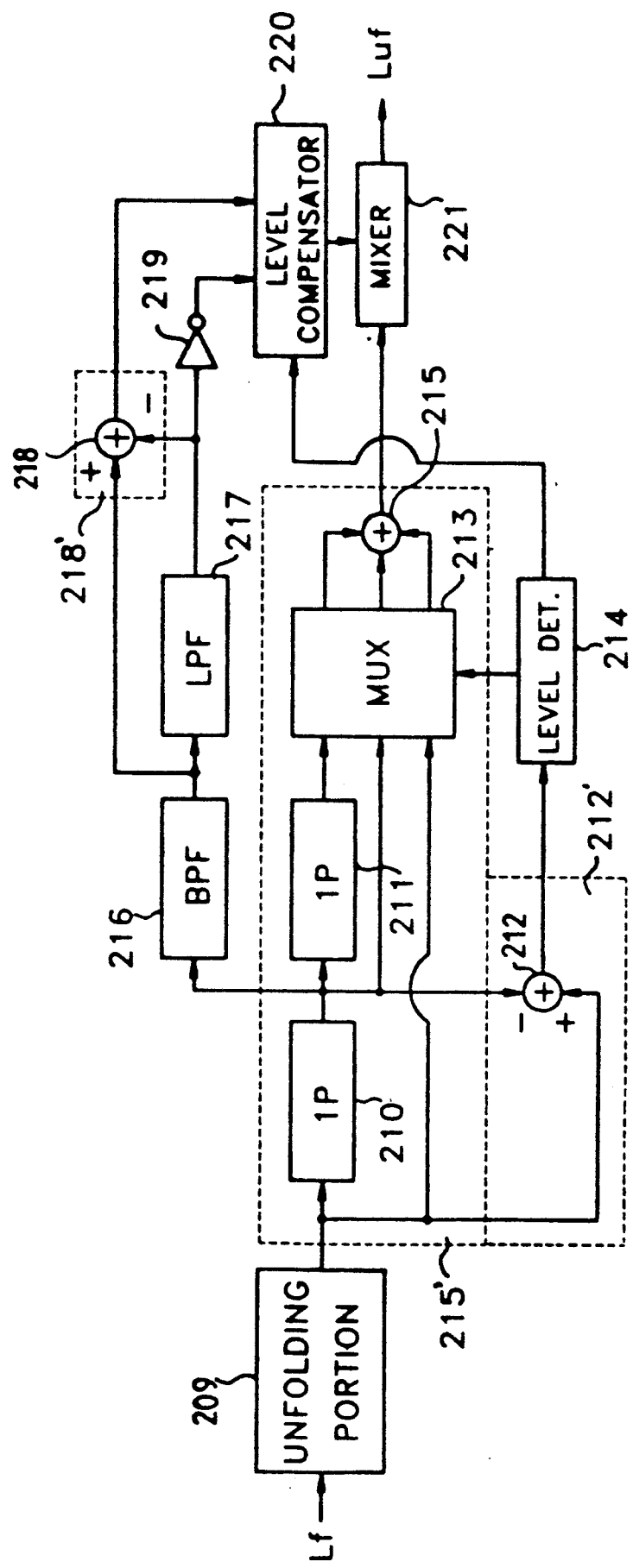
FIG. 4 is a detailed block diagram of an adaptive unfolding circuit according to the present invention, which is adapted to the video signal reproducing circuit shown in FIG. 2.

The adaptive folding/unfolding circuits according to the present invention which are constructed as illustrated in FIGS. 3 and 4 will now be described in detail below.

Figure 2:
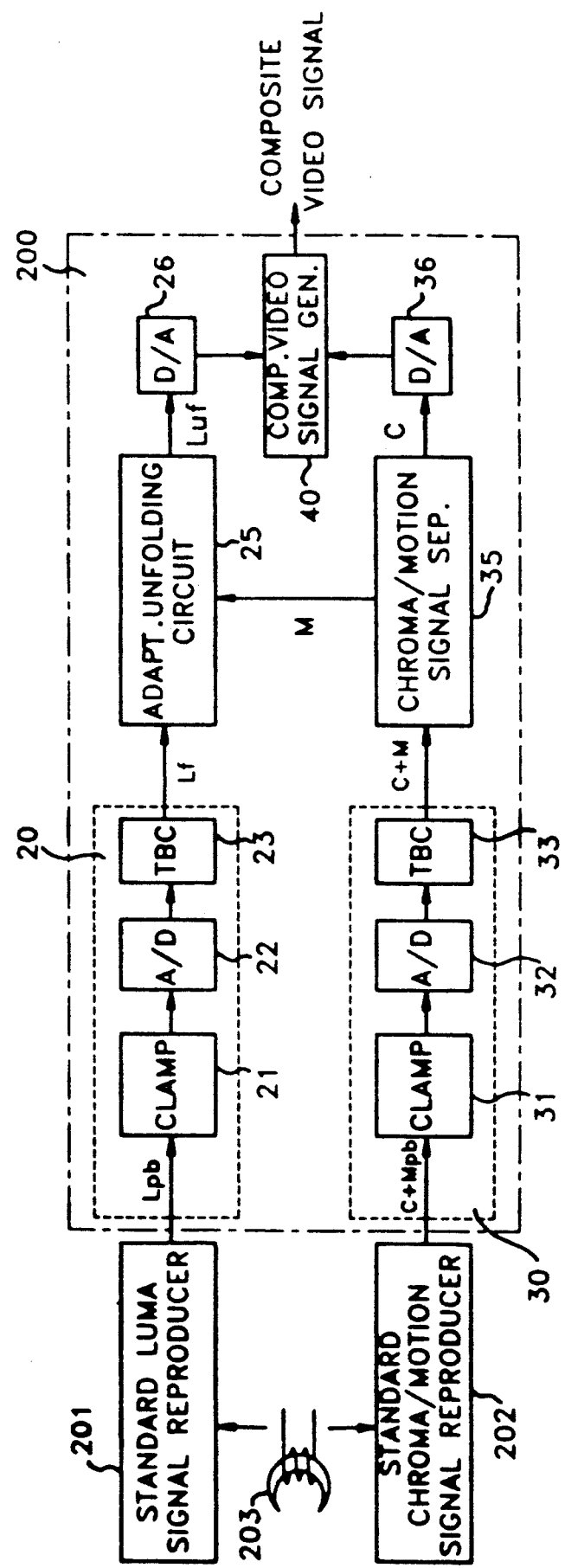
FIG. 2 is a block diagram showing a video signal reproducing circuit of a video signal recorder/reproducer to which the present invention is adapted.

FIG. 3 is a detailed block diagram of an adaptive folding circuit according to the present invention which is adapted to the recording circuit shown in FIG. 1, and FIG. 4 is a detailed block diagram of an adaptive unfolding circuit according to the present invention which is adapted to the reproduction circuit shown in FIG. 2. Here, since the adaptive unfolding circuit is very similar to the adaptive folding circuit, the adaptive folding circuit only will be described in detail.

Referring to FIG. 3, the luma signal L input to the adaptive folding circuit is an output signal of the adaptive luma signal separator 12 shown in FIG. 1. The luma signal L is supplied to a first low-pass filter 155' which includes a delaying device having a first delay 150 and a second delay 151 for delaying by one pixel period, respectively, a multiplexer 153, and an adder 155. In addition, the luma signal L is also supplied to a first high-pass filter 152' constituted by a subtracter 152. In the first low-pass filter 155', the luma signal L is delayed by one pixel every time it passes the first delay 150 and the second delay 151, respectively, and the first and second delay signals Ab and Ac delayed by one pixel, respectively, are supplied to the multiplexer 153 together with the luma signal L, that is, Aa. The multiplexer 153 receives the luma signal Aa and the first and second delay signals Ab and Ac, and multiplexes them in accordance with the level signal detected by a level detector 154. Then, the outputs from multiplexer 153 are summed in an adder 155 and are supplied to a mixer 161. At this time, the signal input to the level detector 154 is the original luma signal L minus the output signal from the first delay 150. Next, the output signal from the first delay 150 is supplied to both a second high-pass filter 158' constituted by a subtracter 158, and a second low-pass filter 157 via the band-pass filter 156. Here, the cut-off frequency of the second low-pass filter 157 is about 2.5 MHz. The signal having passed through the second low-pass filter 157 is supplied to a subtracter 158, and subtracts from the signal output from the band-pass filter 156. The signal having passed through the subtracter 158 is inverted in an inverter 159, to be input to a level compensator 160.

The signals input to the level compensator 160 are level-compensated in accordance with the output signal of the level detector 154, and are supplied to the mixer 16 1. In the mixer 161, the output signal of the level compensator 160 is mixed with the output signal from the adder 155, and the luma signal of which the signal level of the high frequency component is decreased is output to a folding portion 162. The folding portion 162 adds a folding signal fc to the signal supplied from the mixer 161, and folds the high frequency component into the low frequency component, outputting a frequency-folded luma signal Lf.

In the above-described video signal recorder, the process for frequency-folding after separating the luma signal from the composite video signal and decreasing the signal level of the high frequency component of the luma signal will be described in detail with reference to FIGS. 5Aa through 5I.

Figure 5A:
FIG. 5A$a$ is a waveform of a luma signal input to the adaptive folding circuit shown in FIG. 3.
Figure 5A:
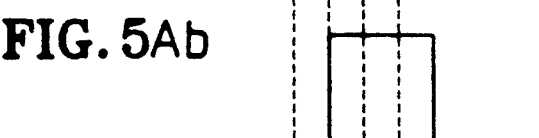
Figure 5A:
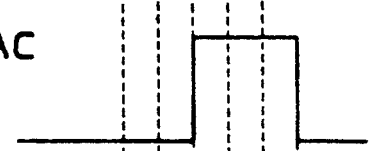
Figure 5B:
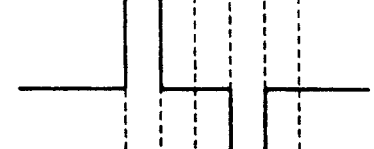
FIG. 5B is a waveform of the output signal of a first high-pass filter shown in FIG. 3.

FIGS. 5Aa through 5Ac are waveforms illustrating respectively the luma signal L, that is, Aa, input to the adaptive folding circuit, and the signals Ab and Ac having passed through the first delay 150 and the second delay 151, shown in FIG. 3. The one pixel-delayed luma signal in FIG. 5Ab is subtracted from the luma signal in FIG. 5Aa in the subtracter 152, producing a signal with the waveform shown in FIG. 5B to the level detector 154. As mentioned above, the subtracter 152 forms the first high-pass filter 152' which passes the high band component of the luma signal L. In the level detector 154, the level value K in accordance with the amount of the luma signal level is detected and supplied to the multiplexer 153. The multiplexer 153 adapts the level value K to the input signals and multiplexes the input signals. Here, the level value K is a value between "0" and "1", and is adapted to the multiplexer input signals such as waveforms shown in FIGS. 5Aa, 5Ab and 5Ac with the coefficients having values of $(1-K)/2$, K, and $(1-K)/2$, respectively. That is, the level value is adapted to the multiplexer input signals to make the sum of the respective coefficient values become "1".

Figure 5C:
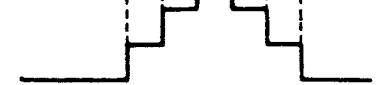
FIG. 5C is a waveform of the output signal of a first low-pass filter shown in FIG.

The signals having passed through the multiplexer 153 in the above-described manner are added in the adder 155, producing a luma signal such as the waveform shown in FIG. 5C which is supplied to the mixer 161.

Figure 5D:
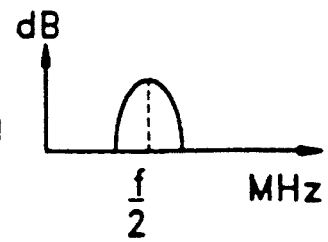
FIG. 5D is a waveform of the signal having passed through a band-pass filter shown in FIG. 3.
Figure 5E:
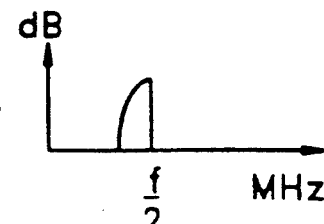
FIG. 5E is a waveform of the signal having passed through a second low-pass filter shown in FIG. 3.

In the meantime, the signal which is one pixel-delayed in the first delay 150 as shown in FIG. 5Ab, outputs a 2.5 MHz bandwidth signal as shown in FIG. 5D through the band-pass filter 156. Thereafter, second low-pass filter 157 filters out signals above 2.5 MHz from the signal shown in FIG. 5D producing the signal shown in FIG. 5E. The output of second low-pass filter 157 also subtracts from the output of band-pass filter 156 in the subtracter 158, thereby outputting the signal such as the waveform shown in FIG. 5F.

Figure 5F:
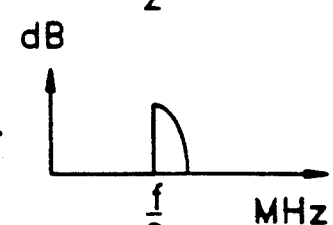
FIG. 5F is an output signal waveform of a second high-pass filter shown in FIG. 3.
Figure 5G:
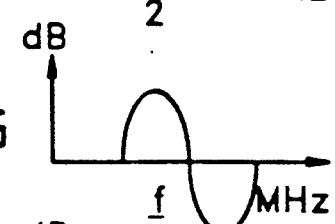
FIG. 5G is an output signal waveform of a level compensator shown in FIG. 3.
Figure 5H:
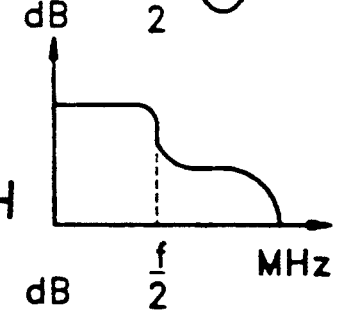
FIG. 5H is an output signal waveform of a mixer shown in FIG. 3.

As mentioned above, the second high-pass filter 158' consists of subtracter 158, and passes just the high-band component of the luma signal. The signal shown in FIG. 5F is inverted in the inverter 159, and supplied to the level compensator 160. The level compensator 160 receives output signals from the second low-pass filter 157 and inverter 159, and in accordance with the level value from the level detector 154, supplies a level-compensated signal such as the waveform shown in FIG. 5G to mixer 161. The mixer 161 mixes the output signal from the adder 155 with the output signal from the level compensator 160 to decrease the component at the high band portion of the luma signal, thereby outputting the signal such as the waveform shown in FIG. 5H.

Figure 5I:
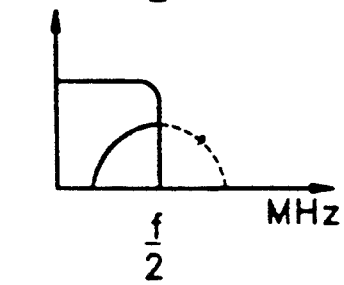
FIG. 5I is an output signal waveform of a folding portion shown in FIG.

Thereafter, after receiving the luma signal of which the signal level of the high frequency component is lowered from the mixer 161, the folding portion 162 then folds the higher frequency component into the lower frequency component of the luma signal in accordance with the folding signal fc, and finally, outputs the frequency-folded luma signal Lf as shown in FIG. 5I.

As a result, in the adaptive folding circuit of the video signal recording circuit according to the present invention, since the signal level of the high frequency component of the luma signal is decreased, and the high frequency component is then folded into the low frequency component, the interference between the low frequency component and the high frequency component of the luma signal can be prevented during recording. Also, the high frequency component remaining in the low frequency component can be reduced even though processing through the unfolding circuit is carried out during reproducing. Further, when the folded signal is reproduced using the reproducer without the unfolding circuit, since the folded high frequency component results in noise during reproducing, the noise-suppressed video signal can be reproduced due to the lowering of the high frequency component signal level of the luma signal during recording.

On the other hand, the adaptive unfolding circuit placed in the luma signal reproducing circuit of the video signal recorder/reproducer as shown in FIG. 4, unfolds the folded luma signal, and then, restores the high frequency component signal level of the unfolded luma signal, while the adaptive folding circuit in FIG. 3 decreases the high frequency component signal level of the luma signal to be folded, and then, the high frequency component is folded into the low frequency component of the luma signal.

In FIG. 4, the adaptive unfolding circuit receives the folded luma signal Lf, and outputs the luma signal unfolded in an unfolding portion 209. However, since the unfolded luma signal has the high frequency component of which signal level is lowered during recording, the lowered signal level of the high frequency component should be restored. For this, the adaptive unfolding circuit has a circuit between the unfolding portion 209 of FIG. 4 and the first D/A converter 26 of FIG. 2. Here, the construction of the above-mentioned circuit installed between the unfolding portion 209 and the first D/A converter 26 is similar to the circuit installed between the folding portion 162 of the adaptive folding circuit in FIG. 3 and the adaptive luma signal separator 12 in FIG. 1, but the operation is reversely performed as compared with that of the adaptive folding circuit.

The inverter 159 is positioned at the output terminal of the subtracter 158 in FIG. 3. However, in FIG. 4, inverter 219 is positioned at the output terminal of the second low-pass filter 217 to convert the output of the second low-pass filter 217, supplying it to the level compensator 220.

In the adaptive folding/unfolding circuits of the video signal processor in the video signal recorder/reproducer according to the present invention as described above, since the signal level of the high frequency component to be folded is lowered during folding process, and the unfolded high frequency component signal level is restored during unfolding, it is possible to prevent both the the high frequency component from interfering with the low frequency component, and the deterioration of the image quality due to the high frequency component remaining in the low frequency component after unfolding.

What is claimed is:

1. A video signal recording circuit comprising a chroma/motion signal processor for analog-to-digital converting a composite video signal, for separating chroma and motion signals from the digital composite video signal, and for mixing said chroma and motion signals; an adaptive luma signal processor for separating a luma signal from said digital composite video signal, and for adaptively processing said luma signal in accordance with said separated motion signal; adaptive folding means for adding a folding signal to said luma signal supplied from said adaptive luma signal processor, and for folding a high frequency component into a low frequency component of said luma signal; and a luma/chroma recorder for digital-to-analog converting the signals supplied from said adaptive folding means and from said chroma/motion signal processor and recording the analog-converting signals, said adaptive folding means comprising:

first low-pass filter means for low-pass filtering said luma signal supplied from said adaptive luma signal processor;

first high-pass filter means for high-pass filtering the luma signals supplied from said adaptive luma signal processor and from a first output of said first low-pass filter means;

band-pass filter means for band-pass filtering the luma signal supplied from the first output of said first low-pass filter means;

second low-pass filter means for low-pass filtering the signal supplied from said band-pass filter means;

second high-pass filter means for high-pass filtering the signal from said band-pass filter means and the signal from said second low-pass filter means;

inverting means for inverting the signal supplied from said second high-pass filter means;

level compensating means for compensating the frequency level of the signals supplied from said second low-pass filter means and from said inverter means;

level detecting means for receiving and detecting the level of the signal supplied from said first high-pass filter means, and for supplying the detected level signal to said first low-pass filter means and to said level compensating means;

mixing means for receiving the signals supplied from the second output terminal of said first low-pass filter means and from said level compensating means, and for outputting an output signal having a high frequency component exhibiting a lowered amplitude; and folding means for adding a folding signal to the output signal supplied from said mixing means, and for folding the high frequency component into the low frequency component of the output signal.

2. A video signal recording circuit of a video signal recorder/reproducer as claimed in claim 1, wherein said first low-pass filter means comprises:

first and second pixel delays connected in series to each other and to said adaptive luma signal processor;

a multiplexer having a first input terminal connected to the output terminal of said adaptive luma signal processor, a second input terminal connected to the output terminal of said first delay, and a third input terminal connected to the output terminal of sa second delay; and means for adding the output signals supplied from said multiplexer, whereby the three signals input to said multiplexer are multiplexed and added in accordance with the level value of the luma signal supplied from said level detecting means.

3. A video signal reproducing circuit, comprising:

standard luma reproducing means for reproducing a composite video signal recorded on a record medium via a reproducing head, and for reproducing a luma signal having a high frequency component folded into a low frequency component included in said composite video signal;

standard chroma/motion signal reproducing means for reproducing a chroma/motion signal representing a chroma and motion signal from said composite video signal;

luma signal preprocessor means connected to said standard luma reproducing means, for clamping and analog-to-digital converting said luma signal, and for generating a first time base-corrected signal;

chroma/motion signal preprocessor means connected to said standard chroma/motion signal reproducer, for clamping and analog-to-digital converting said chroma/motion signal, and for generating a second time base-corrected signal;

chroma/motion signal separator means for separating said second time base-corrected signal into chroma and motion signals;

adaptive unfolding means for receiving said first time base-corrected signal from said luma signal preprocessor means, for removing a folding signal included in said first time base corrected signal in accordance with an amplitude of said motion signal separated from said second time base-corrected signal, and for adaptively unfolding the high frequency component folded into the low frequency component of said first time-base corrected signal to output the unfolded luma signal; and composite video signal generating means for digital-to-analog converting the signals which are supplied from the adaptive unfolding means, and said chroma/motion signal separator means, respectively, and mixing the analog-converted signals to output a composite video signal;

said adaptive unfolding means comprising:

unfolding means for removing the folding signal from the signal supplied from the luma signal preprocessor means, and for unfolding and outputting said high frequency component folded into the low frequency component of said first time base corrected signal;

first low-pass filter means for low-pass filtering the unfolded luma signal supplied from said unfolding means;

first high-pass filter means for high-pass filtering signals supplied from said unfolding means and from the first output terminal of said first low-pass filter means;

band-pass filter means for band-pass filtering a signal supplied from the first output terminal of said first low-pass filter means;

second low-pass filter means for low-pass filtering a signal supplied from said bandpass filter means;

second high-pass filter means for high-pass filtering signals supplied from said bandpass filter means and from said second low-pass filter means;

inverting means for inverting a signal supplied from said second low-pass filter means;

level compensating means for compensating frequency levels of signals supplied from said inverting means and from said second high-pass filter means;

level detecting means for detecting an amplitude of a signal supplied from said first high-pass filter means, and for supplying to said first low-pass filter means and said level compensating means a detected level signal indicative of said amplitude; and mixing means for receiving the signals supplied from the second output terminal of said first low-pass filter means and from said level compensating means, and for outputting a signal exhibiting a restored high frequency amplitude.

4. A video signal reproducing circuit of a video signal recorder/reproducer as claimed in claim 3, wherein said first low-pass filter further comprises:

first and second pixel-time delays serially connected to each other, for delaying the signal output from said unfolding portion by one-pixel period, respectively;

a multiplexer having a first input terminal connected to the output terminal of said unfolding portion, a second input terminal connected to the output terminal of said first delay, and a third input terminal connected to the output terminal of said second delay; and an adder for adding the signals output from said multiplexer, whereby said three signals input to said multiplexer are multiplexed and added in accordance with the level value of said luma signal supplied from said level detector.

5. In a video recording device including a folding circuit for folding a high frequency component of level adjusted video signals into a low frequency component of said level adjusted video signals and a level adjusting portion for lowering an amplitude of a high frequency component of received video signals relative to a low frequency component of said received video signals to generate said level adjusted video signals, said level adjusting portion comprising:

level detecting means for generating control signals indicative of detected levels of said received video signals;

first low pass filtering means for low pass filtering said received video signals;

band pass filtering means for band pass filtering in response to said received video signals;

first means for high pass filtering being responsive to an output of said band pass filtering means;

second means for low pass filtering being responsive to an output of said band pass filtering means;

level compensating means, responsive to said second low pass filtering means and said first high pass filtering means, for level compensating in dependence upon said control signals; and mixing means, responsive to outputs of said first low pass filtering means and said level compensating means, for generating said level adjusted video signals.

6. A level adjusting portion as claimed in claim 5, further comprising second high pass filtering means for high pass filtering said received video signals received by said level detecting means.

7. A video signal recording device, comprising:
means for separating chrominance signals from a composite video signal;
means for separating luminance signals from said composite video signal;
level detecting means for generating control signals indicative of detected levels of said luminance signals;
first low pass filtering means for low pass filtering said luminance signals;
band pass filtering means for band pass filtering in response to said luminance signals;
first means for high pass filtering being responsive to an output of said band pass filtering means;
second means for low pass filtering being responsive to an output of said band pass filtering means;
level compensating means, responsive to outputs of said second low pass filtering means and said first high pass filtering means, for level compensating in dependence upon said control signals to lower an amplitude of a high frequency component of said luminance signals relative to a low frequency component of said luminance signals;

means for mixing being responsive to outputs of said low pass filtering means and said level compensating means; and means for holding said high frequency component of said luminance signals into said low frequency component of said luminance signals received from said mixing means.

8. A video signal recording device as claimed in claim 7, further comprising:
means for separating motion signals from said composite video signals and
said means for separating said luminance signals adaptively processing said composite luminance signals in response to said motion signals to generate said luminance signals.

9. A video signal recording device as claimed in claim 7, further comprising second high pass filtering means for high pass filtering said luminance signals received by said level detecting means.

10. A luminance signal processing circuit, comprising:
level detecting means for generating control signals indicative of detected levels of input luminance signals;
first low pass filtering means for low pass filtering said input luminance signals;
band pass filtering means for band pass filtering in response to said input luminance signals;
first means for high pass filtering being responsive to n output of said band pass filtering means;
second means or low pass filtering being responsive to an output of said band pass filtering means; level compensating means, responsive to outputs of said second low pass filtering means and said first high pass filtering means, for level compensating in dependence upon said control signals; and
means for mixing being responsive to outputs of said first low pass filtering means and said level compensating means.

11. A luminance signal processing circuit as claimed in claim 10, wherein said luminance signal processing circuit adaptively attenuates an amplitude of a high frequency component of said input luminance signals relative to a low frequency component of said input luminance signals to generate output luminance signals.

12. A luminance signal processing circuit as claimed in claim 10, wherein said first low pass filtering means comprises:
delay means for delaying said input luminance signals to generate first delayed luminance signals and second delayed luminance signals; and
weight and adding means for multiplying said input luminance signals, said first delayed luminance signals, and said second delayed luminance signals by factors determined in response to said control signals.

13. A luminance signal processing circuit as claimed in claim 12, further comprised o:
said band pass filtering means band pass filtering said first delayed luminance signals to generate and pass filtered signals;
said second low pass filtering means filtering said band pass filtered signals to generate low pass filtered signals;

said first high pass filtering means providing first high pass filtered signals by calculating differences between said band pass filtered signals and said low pass filtered signals;

said level compensating means combining said first high pass filtered signals and said low pass filtered signals in response to said control signals to generate compensated signals; and said mixing means mixing said compensated signals with a signal output of said weight and adding means.

14. In a video reproducing device including a decoding circuit for unfolding received video signals, a level adjusting portion for increasing a level of a high frequency component of the unfolded video signals relative to a low frequency component of said unfolded video signals, said level adjusting portion comprising:

level detecting means for generating control signals indicative of detected levels of said unfolded video signals;

first low pass filtering means for low pass filtering said unfolded video signals;

band pass filtering means for band pass filtering said unfolded video signals;

first high pass filtering means for generating a high pass filtered signal by high pass filtering a signal output of said band pass filtering means;

second low pass filtering means for generating a low pass filtered signal by low pass filtering a signal output of said band pass filtering means;

level compensating means, responsive to said low pass filtered signal and said high pass filtered signal, for level compensating in dependence upon said control signals; and mixing means, responsive to said first low pass filtering means and said level compensating means, for generating level adjusted video signals.

15. A video signal encoding device, comprising:

first low pass filtering means for generating first low pass filtered video signals by low pass filtering received video signals;

band pass filtering means for generating band pass filtered video signals in response to said received video signals;

first high pass filtering means for generating first high pass filtered video signals; by high pass filtering said band pass filtered video signals;

second low pass filtering means for generating second low pass filtered video signals by low pass filtering said band pass filtered video signals;

level compensating means for generating level compensating signals in response said first high pass filtered video signals, said second low pass filtered video signals, and control signals, said control signals being indicative of detected levels of said received video signals;

mixing means for generating level compensated video signals by mixing said first low pass filtered signals and said level compensating signals; and means for folding a high frequency component of said level compensated video signals onto a low frequency component of said level compensated video signals.

16. A video signal encoding device as claimed in claim 15, further comprising:

second high pass filtering means for generating second high pass filtered video signals by high pass filtering in response to said received video signals; and level detecting means for generating said control signals in response to detected levels of said second high pass filtered video signals.

17. A video signal encoding device as claimed in claim 15, wherein said first low pass filtering means comprises:

a first one pixel delay and a second one pixel delay for generating one pixel delayed video signals and two pixel delayed video signals by delaying said received video signals; and multiplexing and combining means for selectively providing one of amplitude adjusted said one pixel delayed video signals, amplitude adjusted said two pixel delayed video signals, and amplitude adjusted said received video signals to generate combined signals being said first low pass filtered video signals.

18. A video signal encoding device as claimed in claim 17, wherein said second high pass filtering means comprises means for differencing said received video signals and said one pixel delayed video signals to generate said second high pass filtered video signals.

19. A video signal encoding device as claimed in claim 15, wherein said first high pass filtering means comprises means for differencing said band pass filtered video signals and said second low pass filtered video signals to generate said second high pass filtered video signals.

20. A video signal encoding device as claimed in claim 15, further comprised of means for inverting said first high pass filtered video signals prior to provision to said level compensating means.

21. A video signal encoding device as claimed in claim 15, wherein said video signal encoding device is an adaptive folding section for a luminance processing prior to recordation.

22. A video signal encoding device as claimed in claim 15, wherein said multiplexing means increases an amplitude of said one pixel delayed video signals in response to a sum of decreases in the amplitudes of the said two pixel delayed video signals and said received video signals.

23. A video signal decoding device, comprising:

unfolding means for generating unfolded video signals by unfolding a high frequency component of received video signals from a low frequency component of said received video signals;

first low pass filtering means for generating first low pass filtered video signals by low pass filtering said unfolded video signals;

band pass filtering means for generating band pass filtered video signals in response to said unfolded video signals;

first high pass filtering means for generating first high pass filtered video signals by high pass filtering said band pass filtered video signals;

second low pass filtering means for generating second low pass filtered video signals by low pass filtering said band pass filtered video signals;

level compensating means for generating level compensating signals in response said first high pass filtered video signals, said second low pass filtered video signals, and control signals, said control signals being indicative of detected levels of said unfolded video signals; and mixing means for generating level compensated video signals by mixing said first low pass filtered signals and said level compensating signals.

24. A video signal decoding device as claimed in claim 23, comprising further comprising:
second high pass filtering means for generating second high pass filtered video signals by high pass filtering in response to said unfolded video signals;
level detecting means for generating said control signals in response to detected levels of said second high pass filtered video signals.

25. A video signal decoding device as claimed in claim 23, wherein said first low pass filtering means comprises:
a first one pixel delay and a second one pixel delay for generating one pixel delayed video signals and two pixel delayed video signals by delaying said unfolded video signals;
multiplexing means for selectively providing one of said one pixel delayed video signals, said two pixel delayed video signals, and said unfolded video signals to generate combined signals being said first low pass filtered video signals.

26. A video signal decoding device as claimed in claim 25, wherein said second high pass filtering means comprises means for differencing said unfolded video signals and said one pixel delayed video signals to generate said second high pass filtered video signals.

27. A video signal decoding device as claimed in claim 23, wherein said first high pass filtering means comprises means for differencing said band pass filtered video signals and said second low pass filtered video signals to generate said second high pass filtered video signals.

28. A video signal decoding device as claimed in claim 23, further comprised of means for inverting said second low pass filtered video signals prior to provision to said level compensating means.

29. A video signal decoding device as claimed in claim 23, wherein said video signal decoding device is an adaptive unfolding section for a luminance reproducing device.

* * * * *

UNITED STATES PATENT AND TRADEMARK OFFICE
CERTIFICATE OF CORRECTION

PATENT NO. : 5,333,060
DATED : 26 July 1994
INVENTOR(S) : Jong-Kyung Yun

It is certified that error appears in the above-indentified patent and that said Letters Patent is hereby corrected as shown below:

| | | |
|---|---|---|
| Column 1 | Line 58, | Start the paragraph with capital letter --S-- (change "still" to --Still--), |
| Column 4 | Line 10, | After "Fig.", insert -- 3; --, |
| | Line 22, | after "Fig.", insert -- 3. --, |
| Column 5 | Line 20, | change "reprocessed" to --preprocessed-- |

IN THE CLAIMS

| | | | |
|---|---|---|---|
| Column 9 | Claim 2 | Line 47, | after "of", change "sa" to --said--, |
| Column 12 | Claim 10 | Line 34, | preceding "output", change "n" to --an--, |
| | Claim 13 | Line 62, | after "comprised", change "o" to --of--, |

UNITED STATES PATENT AND TRADEMARK OFFICE
CERTIFICATE OF CORRECTION

PATENT NO. : 5,333,060
DATED : July 26, 1994
INVENTOR(S) : Jong-Kyung Yun

It is certified that error appears in the above-indentified patent and that said Letters Patent is hereby corrected as shown below:

Column 12, line 64, after "generate" change "and" to —band—.

Signed and Sealed this

Twelfth Day of November, 1996

*Attest:*

BRUCE LEHMAN

*Attesting Officer*     *Commissioner of Patents and Trademarks*